(12) United States Patent
Ovshinsky (10) Patent No.: US 7,250,386 B2
(45) Date of Patent: Jul. 31, 2007

(54) QUANTUM LIMIT CATALYSTS AND HYDROGEN STORAGE MATERIALS

(75) Inventor: Stanford R. Ovshinsky, Bloomfield Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/733,088

(22) Filed: Dec. 11, 2003

(65) Prior Publication Data

US 2005/0014640 A1  Jan. 20, 2005

Related U.S. Application Data

(63) Continuation-in-part of application No. 10/623,939, filed on Jul. 18, 2003.

(51) Int. Cl.
 *B01J 23/02* (2006.01)
 *B01J 23/00* (2006.01)
(52) U.S. Cl. .................. 502/340; 502/325; 502/326; 502/328; 502/311; 502/312
(58) Field of Classification Search ............... 502/325, 502/326, 328, 311, 312, 340; 420/581, 582, 420/583, 584.1, 585, 586, 586.1, 587, 588, 420/589, 900
 See application file for complete search history.

(56) References Cited

U.S. PATENT DOCUMENTS

| | | | | |
|---|---|---|---|---|
| 3,317,439 | A * | 5/1967 | Stiles | 502/242 |
| 4,177,473 | A * | 12/1979 | Ovshinsky | 252/62.3 E |
| 4,177,474 | A * | 12/1979 | Ovshinsky | 252/62.3 E |
| 4,431,561 | A * | 2/1984 | Ovshinsky et al. | 420/402 |
| 4,520,039 | A * | 5/1985 | Ovshinsky | 427/457 |
| 4,623,597 | A * | 11/1986 | Sapru et al. | 429/101 |
| 4,664,960 | A * | 5/1987 | Ovshinsky | 428/98 |
| 5,278,001 | A * | 1/1994 | Ono et al. | 429/101 |
| 5,536,591 | A * | 7/1996 | Fetcenko et al. | 429/59 |
| 5,616,432 | A * | 4/1997 | Ovshinsky et al. | 429/59 |
| 5,840,440 | A * | 11/1998 | Ovshinsky et al. | 429/60 |
| 5,879,447 | A * | 3/1999 | Okada et al. | 117/8 |
| 6,033,471 | A * | 3/2000 | Nakanishi et al. | 117/108 |
| 6,093,243 | A * | 7/2000 | Okada et al. | 117/8 |
| 6,270,719 | B1 * | 8/2001 | Fetcenko et al. | 429/588 |
| 6,514,479 | B1 * | 2/2003 | Merlen et al. | 423/705 |
| 6,723,421 | B2 * | 4/2004 | Ovshinsky et al. | 428/315.7 |
| 2003/0096098 | A1 * | 5/2003 | Ovshinsky et al. | 428/310.5 |

* cited by examiner

*Primary Examiner*—Cam N. Nguyen
(74) *Attorney, Agent, or Firm*—Kevin L. Bray (57) ABSTRACT

A quantum limit catalyst. The instant quantum limit catalyst is comprised of atomic aggregations whose dimensions correspond to the quantum limit. In the quantum limit, the atomic aggregations acquire structural configurations and electronic interactions not attainable in the macroscopic limit. The structural configurations possible in the quantum limit correspond to atomic aggregations having bond lengths, bond angles, topologies and coordination environments that differ from those found in the macroscopic limit. The electronic interactions possible in the quantum limit originate from wavefunction overlap and tunneling between atoms and lead to modifications in the magnitude and/or spatial distribution of electron density at catalytic sites to provide improved catalytic properties. Representative quantum limit catalysts include quantum scale atomic aggregations of metal atoms. Examples including catalysts derived from Fe, Mg, V and Co are disclosed. Catalytic properties are exemplified in the context of hydrogen storage.

21 Claims, 4 Drawing Sheets

QUANTUM LIMIT CATALYSTS AND HYDROGEN STORAGE MATERIALS

RELATED APPLICATION INFORMATION

This application is a continuation-in-part of U.S. patent application Ser. No. 10/623,939 entitled "Supported Catalyst having Electronic Interaction between Catalytic Phase and Support Matrix" and filed on Jul. 18, 2003; the disclosure of which is incorporated by reference herein.

FIELD OF INVENTION

This invention pertains to catalysts comprised of atomic aggregations having length scales in the quantum regime. More particularly, this invention relates to catalysts having catalytic sites whose catalytic properties result from quantum mechanically induced modifications of electron density originating from wavefunction overlap. Most particularly, this invention relates to hydrogen storage materials having hydrogen storage sites with binding energies for atomic hydrogen that provide high hydrogen storage densities as well as favorable hydrogen release rates at temperatures only modestly above room temperature.

BACKGROUND OF THE INVENTION

The world is facing an impending energy crisis as the consumption of fossil fuels increases. The dimensions of the crisis include scarcity of fossil fuels as supplies become depleted, escalating costs, confrontations over supplies, pollution and global warming. As more societies modernize in the near future, the magnitude of the crisis will only multiply. It has never been more clear that the world needs to develop and implement new sources of energy.

The most ubiquitous element in the universe, hydrogen, offers unprecedented opportunities for reducing the world's dependence on fossil fuels. Hydrogen is a virtually inexhaustible fuel source and is available from a variety of raw materials including coal, natural gas and hydrocarbons in general, inorganic hydrides and water. Water electrolysis, a method in which water is split into hydrogen gas and oxygen gas, is one attractive method for producing hydrogen. The energy required to effect electrolysis may be obtained from non-fossil fuel sources such as solar energy, wind power, geothermal energy or nuclear energy. In addition to being plentiful and widely available throughout the world, hydrogen is also a clean fuel source. Combustion of hydrogen with oxygen to provide energy produces only water as a by-product and avoids the undesired generation of greenhouse gases and other pollutants. Hydrogen truly is a green energy source.

Having identified hydrogen as a readily available fuel source with desirable combustion properties, realization of a hydrogen based fuel economy requires the development of an infrastructure for making hydrogen accessible to the public. A key element of this infrastructure is a safe and reliable means for storing and delivering hydrogen. The storage of hydrogen in the solid state is the preferred method for storing hydrogen because it avoids the high pressures required for gas phase storage of hydrogen and the low temperatures required for liquid phase storage of hydrogen. The solid state storage of hydrogen is most effectively realized through hydrogen storage alloy materials. A hydrogen storage alloy is a solid state material that is capable of reversibly storing hydrogen, typically in the form of atomic hydrogen.

A conventional hydrogen storage alloy is a metal or metal alloy that includes catalytic sites and hydrogen storage sites. Storage of hydrogen is accomplished through the conversion of hydrogen gas to atomic hydrogen at catalytic sties followed by the binding or retention of hydrogen at hydrogen storage sites. In the hydrogen storage process, a hydrogen storage alloy is exposed to hydrogen gas, which adsorbs onto, diffuses into or otherwise interacts with the hydrogen storage alloy to reach the catalytic sites that convert it to atomic hydrogen. The atomic hydrogen subsequently migrates to a hydrogen storage site, where it is stably retained until the release process is initiated. The release of hydrogen is accomplished by adding thermal energy to the hydrogen storage alloy to free atomic hydrogen from hydrogen storage sites and induce migration of atomic hydrogen to catalytic sites that subsequently effect recombination of atomic hydrogen to form hydrogen gas, which then desorbs, diffuses or otherwise vacates the alloy to provide hydrogen fuel.

An important objective in hydrogen storage is the development of hydrogen storage alloys that are capable of storing large amounts of hydrogen in small volumes with rapid uptake and release of hydrogen. The realization of high hydrogen storage density and rapid kinetics for the storage and release processes requires careful consideration of the chemical and physical factors that contribute to the mechanisms that underlie the hydrogen storage and release processes. The kinetics of the hydrogen storage and release processes are promoted through the presence of a high number of catalytic sites having sufficient activity in a hydrogen storage alloy as well as through the existence of a sufficiently porous surrounding structural matrix to support the catalytic sites. A porous support matrix is desirable because it facilitates access of hydrogen gas to and from the catalytic sites during storage and release, respectively. A porous support matrix is also desirable because it promotes migration of atomic hydrogen to and from hydrogen storage sites during storage and release, respectively.

High hydrogen storage density is promoted through the presence of a high number of hydrogen storage sites that provide sufficient stabilizing interactions to bind or otherwise retain atomic hydrogen. Strong stabilizing interactions, however, precariously compete with the requirements for rapid release kinetics and release at reasonable temperatures. Although the strong binding of hydrogen is conducive to high hydrogen storage density, strongly bound hydrogen is difficult to liberate and is therefore detrimental to the objective of achieving rapid release kinetics. Strongly bound hydrogen can be released at reasonable rates only at high, and oftentimes inconvenient or impractical, temperatures.

Conventional hydrogen storage alloys are metals or metal alloys. Originally, metals or metal alloys prepared by equilibrium melting and cooling methods were used as hydrogen storage alloys. Equilibrium hydrogen storage alloys have structural and bonding properties that are dictated by thermodynamic considerations. Typically, equilibrium hydrogen storage alloys are densely packed with low porosity, a low number of catalytic sites and strongly binding hydrogen storage sites. The dense packing and low porosity are consequences of the metal-metal bonding that is characteristic of metals and metal alloys. With the exception of a thin metal oxide layer at the surface, the metal atoms of metals and metal alloys are exclusively bonded to other metal atoms to form an extended metal-metal bonding scheme that provides a material with closely spaced metal atoms and with strong electronic interactions between metal atoms. The close proximity of metal atoms leads to low porosity as well as to a high electron density between metal atoms that contributes to the typically high stabilization or binding of atomic hydrogen at hydrogen storage sites. The number of catalytic sites is also low because catalysis is primarily a surface phenomenon that occurs at surface irregularities such as dislocation sites, crystal steps, impurities etc. Since these surface irregularities occur unintentionally in equilibrium hydrogen storage alloys, the number of catalytic sites is low and the overall catalytic efficiency is unnecessarily low.

The low porosity, high hydrogen binding energy and low concentration of catalytic sites limits the range of application of conventional hydrogen storage alloys. Since conventional hydrogen storage alloys present a trade-off between the two principal desired characteristics (high hydrogen storage density and rapid kinetics), products and applications of hydrogen storage materials have typically focused on optimizing one of the principle characteristics at the expense of the other. Current hydrogen storage alloys are incapable of providing the high hydrogen storage densities and rapid kinetics at reasonable temperatures required for a wide range of practical applications, including storage and delivery of hydrogen as a fuel for automobiles and other vehicles. The needs of this and other applications requires the development of new hydrogen storage materials based on new and non-conventional chemical and physical paradigms.

SUMMARY OF THE INVENTION

This invention provides a new class of catalytic and hydrogen storage materials that include chemical bonding and atomic arrangements that deviate from the atomic configurations found in conventional hydrogen storage alloys to provide new degrees of freedom in controlling hydrogen storage density and the kinetics of hydrogen storage and retrieval. The instant materials exploit beneficial properties that arise as the dimensions of the structural units of a catalytic or hydrogen storage material transcend the macroscopic length scales of conventional materials and enter the quantum regime. In the quantum limit, atomic arrangements become possible in which bond angles, bond lengths, coordination number and composition deviate from the prescribed conformity of the macroscopic limit. As a result, it becomes possible to control the distribution of electron density throughout the instant hydrogen storage materials and to thereby control the binding strength of hydrogen within the instant hydrogen storage materials. Catalytic activity is also beneficially affected in the quantum limit.

The instant catalytic or hydrogen storage materials comprise metals or metal alloys in angstrom scale atomic configurations. The bond angles and bond lengths within the configurations deviate from those of conventional materials. Enhanced catalytic activity and a broader spectrum of hydrogen binding energies is achieved by managing the intermolecular interactions responsible for chemical reactivity and binding through control of the local electron density within the instant catalytic or hydrogen storage materials. Bond angle deviations influence electron density by influencing wavefunction or orbital overlap and the degree of electron delocalization. Bond length deviations can also influence wavefunction or orbital overlap as well as the volume of space occupied by bonding electrons. Through the creation of materials in the quantum limit of dimensionality, the instant inventors have greatly expanded the range of atomic configurations available to metal atoms, thereby providing unprecedented control over the competing electronic interactions that govern catalytic performance in general, including the hydrogen storage and retrieval processes in hydrogen storage materials. Representative quantum limit materials according to the instant invention include Mg, Fe, Co, and V as well as alloys of these elements with each other and other elements in a supported or unsupported form. In supported embodiments, a catalytic phase is formed on, dispersed on or otherwise chemically or physically attached to a substrate or support matrix. In the quantum limit, interactions originating from wavefunction overlap develop between the catalytic phase and support matrix to provide modifications in electron density at catalytic sites and in portions of the support matrix in the vicinity of supported catalytic particles. These modifications constitute a quantum induced electronic interaction that enhances catalytic performance.

In one embodiment, the instant quantum limit materials are formed in an ultrasonic process. In this embodiment, one or more organometallic precursor compounds is dissolved or suspended in a liquid and subjected to ultrasound. The ultrasound provides local heating and acoustic cavitation that lead to a concentration of energy in the vicinity of the precursor compounds. The energy concentration induces bond cleavage within molecules of the precursor compounds and prompts a reconfiguration of metal atoms or fragments liberated from molecular precursors to form the instant quantum limit materials.

In another embodiment, the instant quantum limit materials are formed in a thermal decomposition process. In this embodiment, one or more organometallic precursor compounds is subjected to a heating treatment that induces thermal cleavage of bonds within molecules of the precursor compounds and a reorganization of metal atoms or fragments to form the instant quantum limit materials.

In yet another embodiment, the instant quantum limit materials are formed in a reductive chemical process. In this embodiment, one or more inorganic salts of one or more metals are combined in solution and subjected to chemical action through a strong reducing species. The reducing species reduces one or more metals from an oxidized state to a neutral state and promotes the formation of metallic clusters or aggregations having dimensions and atomic configurations in the quantum regime.

DETAILED DESCRIPTION OF THE INVENTION

The instant invention provides quantum limit metals and metal alloys that provide superior catalytic and hydrogen storage properties. Catalysis (as well as chemical reactivity in general) and the energetics of binding and releasing adsorbed or absorbed species within a material ultimately depend on a balance of competing and oftentimes opposing steric and/or electronic interactions. Catalysis is a process that typically involves the binding of one or more reactant molecules to a catalytic site of a compound or material followed by reaction or rearrangement of the reactant species to form one or more product species. In addition to providing a binding site, an important role of the catalytic site is a mediation of the electron density in the vicinity of the bound species. Depending on the reaction, catalysis typically involves an ability of a catalytic site to donate or withdraw electron density at the site of catalytic activity. This ability is required because the transformation of a reactant species to a product species inevitably involves a redistribution of electron density as some bonds break, other bonds form or the structure of a reactant species is rearranged. In a pure gas or liquid phase reaction, reactant molecules can to some extent accommodate a need to redistribute electron density through structurally distorted, transient intermediate states. At the surface of a solid state catalyst or in the coordination shell of a gas or liquid phase catalyst, however, the degrees of freedom of structural motion of a reactant species are limited and the ability of a catalyst to receive or donate electron density assumes increasing importance.

A hydrogen storage material is an example of a catalytic material. In a typical hydrogen storage material, hydrogen gas adsorbs onto the surface and becomes bound to a catalytic site at or near the surface. At the catalytic site, hydrogen gas is dissociated into hydrogen atoms that subsequently migrate or diffuse away from the catalytic site to a storage site. Since the number of surface sites is low, high hydrogen storage density requires efficient diffusion or migration of atomic hydrogen to storage sites in the interior of a hydrogen storage material. Atomic hydrogen becomes bound to the storage sites until energy is provided to initiate a release process. In the release process, atomic hydrogen departs storage sites, migrates or diffuses to a catalytic site where recombination of atomic hydrogen to form molecular hydrogen occurs. The molecular hydrogen so formed, subsequently departs the material and becomes available as hydrogen gas.

Electronic interactions, dictated by the distribution of electron density within a hydrogen storage material, influence the important processes associated with the storage and retrieval of hydrogen. The affected processes include: the binding of hydrogen gas to catalytic sites, the catalytic dissociation of molecular hydrogen, the diffusion or migration of atomic hydrogen to and from storage sites, the binding energy of atomic hydrogen in storage sites, and the catalytic association of atomic hydrogen to form molecular hydrogen.

From an applications standpoint, hydrogen storage materials are required that show high hydrogen storage density and rapid hydrogen release at convenient operating temperatures. These two requirements, however, impose conflicting demands on the properties of a hydrogen storage material because high hydrogen storage density is promoted through storage sites having high binding energies, while rapid release of hydrogen from storage sites is promoted through low binding energies at desired operating temperatures. The design of hydrogen storage materials has thus represented a compromise between two competing influences.

An important class of conventional hydrogen storage materials is metals or metal alloys prepared, for example, by melting metallic starting materials followed by subsequent cooling from the melt state. These materials include catalytic sites and storage sites where the storage sites have a distribution of binding energies. Many conventional metals and metal alloys exhibit high hydrogen storage densities (e.g. Mg and Mg-based alloys) due to high binding energies, but are limited in practice to operation at high temperatures (typically 150° C. and above) due to the slow hydrogen release kinetics that result from the need for stored hydrogen to overcome a high energy barrier to become liberated from a storage site. The high energy barrier is a consequence of the high binding energy associated with the hydrogen storage sites of conventional hydrogen storage materials. The predominant storage sites within the distribution of storage binding energies of conventional hydrogen storage materials have sufficiently high binding energies that appreciable hydrogen release rates occur only at higher operating temperatures.

In order to achieve acceptable hydrogen release rates at more convenient temperatures (temperatures closer to room temperature), it is necessary to identify hydrogen storage materials that include a greater number of storage sites having binding energies conducive to rapid hydrogen release at temperatures below those of conventional hydrogen storage materials. In practice, this requires discovering new materials or modifying existing materials to provide a high concentration of hydrogen storage sites having binding energies that are lower than the binding energies of the predominant storage sites of conventional materials. In principle, lower binding energy sites can be produced through the creation of new types of storage sites or a shifting of the distribution of binding energies of existing materials to lower energy.

The binding energy of particular storage sites and the number of storage sites having a particular binding energy ultimately depend on the distribution of electron density within a hydrogen storage material, which, in turn, ultimately depends on the underlying structure and arrangement of atoms within a hydrogen storage material. The key to optimizing the properties of hydrogen storage materials lies in achieving new degrees of freedom in controlling the structure and atomic configurations of hydrogen storage materials (or regions therein). Similar considerations apply to the optimization of the selectivity, efficiency, stability and kinetics of catalytic materials generally where the structure, atomic configuration, and electron density (magnitude and spatial distribution thereof) within the material are essential to catalytic performance.

One of the instant inventors, S. R. Ovshinsky, has made numerous seminal contributions to fundamental and applied chemistry and physics with a particular emphasis on the intelligent design of advanced chemical, electrical and optical materials with new and/or expanded functionality. A key concept advanced by Ovshinsky is an understanding of the new and varied degrees of freedom afforded by the disordered and amorphous states of matter. Ovshinsky recognized that the ordered crystalline lattice imposed many constraints on the structure and properties of materials due to a rigid adherence of atoms to a prescribed structural lattice and instead embraced the disordered and amorphous states for the enormous flexibility in chemical bonding, intermolecular interactions and structural configurations that they provide. Ovshinsky viewed disordered and amorphous materials in terms of constituent local structures, each of which has unique properties according to the chemical elements and topology present, which collectively and synergistically interact to produce macroscopic materials having macroscopic structures and properties that ultimately depend on the local compositions and orbital interactions of the constituent local structures.

Through his viewpoint, Ovshinsky discovered, elucidated and developed the principles of atomic engineering, chemical modification and total interactive environment that have revolutionized the ways in which people view and understand materials and their properties. According to these principles, the structure and properties of materials are strongly interrelated and new material properties necessarily flow from new structural degrees of freedom. Ovshinsky realized that crystalline solids, with their prescribed and rigid structures, were simply incompatible with the goal of designing new materials with new functionality. On the contrary, only the disordered and amorphous states permit the structural flexibility, through control of the local chemical compositions, electron density, topology and assemblage of constituent local structures, necessary to achieve a broad new concept of materials design.

Ovshinsky has further taught the importance of an inhomogeneous arrangement of constituent local structures in disordered and amorphous materials. Inhomogeneous disordered and amorphous materials include local structures whose chemical compositions, topology and orbital interactions are non-uniform over macroscopic length scales throughout a material. Inhomogeneity provides further opportunities to increase the range of structures, and hence properties, available from a material because it provides a means for selectively controlling the placement of atoms and their nearest neighbor interactions to produce a tailored distribution of electron density as well as chemical and topological environments within a material. Inhomogeneity further aids the designer of materials because individual chemical and topological configurations or environments may be mixed, matched and assembled at will to achieve macroscopic materials having a wider spectrum of properties.

The Ovshinsky principles have been previously applied to the design of sites of chemical reactivity in hydrogen storage materials. Instead of relying on the accidental occurrence of surface irregularities, the Ovshinsky principles teach the formation and assembly of catalytic sites having varying degrees of activity and selectivity with respect to one or more reactions. By implementing the Ovshinsky principles, catalytic activity is not restricted to surfaces, but rather becomes a bulk property of a material. The topological freedom afforded by disordered and amorphous materials permits construction and strategic placement of local structural units or sites having desired catalytic performance in high numbers. The engineering of interactions between neighboring sites leads to materials whose catalytic performance is more than a simple superposition of individual contributing sites. Furthermore, by permitting catalysis to occur not only at an exterior surface, but also within the interior of a hydrogen storage alloy, the effective number of catalytic sites is greatly increased.

S. R. Ovshinsky has also demonstrated that surface modification provides an additional degree of freedom in controlling the catalytic activity and number of catalytic sites in a hydrogen storage alloy. Surface modifications include chemical modifications that influence the topology, local order, and/or composition in the vicinity of the surface of a hydrogen storage alloy. Improved catalytic performance of hydrogen storage alloys via the creation of Ni-enriched catalytic sites through chemical modification of a surface oxide layer has been demonstrated. Most hydrogen storage alloys include a surface oxide layer that can be modified according to the Ovshinsky principles to provide nanocrystalline particles of metals or metal alloys that exhibit exceptionally high catalytic activity. Chemical modification of a surface oxide layer may be achieved, for example, through an alkaline etching process that acts to selectively and differentially dissolve and reprecipate various metal elements present in a hydrogen storage alloy to provide a surface layer that is Ni-enriched. The Ni-enriched regions are believed to comprise aggregated Ni atoms in the form of nanocrystalline catalytic particles. The catalytic particles may include Ni alone or an alloy of Ni with one or more other metal atoms. The catalytic Ni or Ni alloy particles are typically below 100 Å in size and separated from each other by distances of 50-100 Å.

Representative examples of the application of the Ovshinsky principles of materials design may be found, for example, in U.S. Pat. Nos. 4,177,473; 4,520,039; 4,664,960; 5,536,591; 5,616,432; 5,840,440 and 6,270,719 to the instant assignee, the disclosures of which are hereby incorporated by reference.

The instant hydrogen storage materials are aimed at controlling the binding strength of hydrogen in hydrogen storage alloys and at resolving the seeming conflict between simultaneously achieving high hydrogen storage capacity and fast hydrogen release kinetics at reasonable temperatures. In the instant invention, the Ovshinsky principles are further extended to address the need for achieving hydrogen storage materials having storage binding energies favorable to operation at temperatures below those of current materials. Although the Ovshinsky principles have been successfully applied to the enhancement in the activity and number of catalytic sites in hydrogen storage materials, the best hydrogen storage alloys currently available still include hydrogen storage sites that are reminiscent of those that occur in conventional hydrogen storage alloys. More specifically, the hydrogen storage sites of the current hydrogen storage alloys are comprised of extended assemblies of metal atoms that are in close proximity to each other and that experience strong mutual electronic interactions. The binding strength of hydrogen to the storage sites of existing hydrogen storage alloys are accordingly high and as a result, commensurately high temperatures are needed to realize release of hydrogen at reasonable rates for practical applications, as described hereinabove.

Previous implementations of the Ovshinsky principles to the hydrogen storage sites have demonstrated the beneficial effects associated with creating hydrogen storage sites based on disordered assemblies of metal atoms. Disorder permits the creation and assemblage of local structures having unique topologies and electronic interactions and provides hydrogen storage materials that possess a broader spectrum of hydrogen storage sites than equilibrium hydrogen storage alloys. The broader spectrum of sites includes non-conventional sites not found in equilibrium hydrogen storage alloys that are capable of binding hydrogen (see, for example U.S. Pat. No. 5,840,440).

In the instant hydrogen storage materials, the spectrum of hydrogen storage sites is enlarged to obtain storage sites displaying a wider range of binding strengths for hydrogen storage. Whereas previous work by Ovshinsky has emphasized the formation of a large number of storage sites, the instant invention emphasizes the formation of storage sites having a broader range of binding strengths. More specifically, the instant invention demonstrates the creation of hydrogen storage sites having reduced binding strengths relative to storage sites found in the currently available hydrogen storage materials. The binding strengths of the new storage sites are sufficiently high to effectively bind hydrogen, but not so high as to significantly inhibit discharge kinetics at temperatures only slightly above room temperature. As a result, the new class of hydrogen storage materials provides both high hydrogen storage capacity and rapid discharge kinetics at reasonable temperatures.

The instant inventors have recognized that the range of binding energies of storage sites in conventional hydrogen storage materials is necessarily limited because the structures of conventional hydrogen storage materials are rigidly prescribed by the constraints imposed by macroscopic length scales. In the instant invention, the inventors realize the release of these constraints through the formation of hydrogen storage materials having atomic configurations characterized by length scales in the quantum regime. The quantum regime is a non-macroscopic regime that offers new possibilities for structure and bonding within and between atomic aggregations. As a result, the quantum limit provides new opportunities for controlling the distribution of electron density within atomic aggregations and consequently, provides new opportunities for realizing hydrogen storage sites having unconventional binding energies better suited for hydrogen release at lower temperatures. Further rationale for working in the quantum limit is presented in the following discussion.

Motivation for the instant quantum limit materials originates from a consideration of the nature of the interaction of atomic hydrogen with hydrogen storage sites. The hydrogen storage process requires a localized stabilization of atomic hydrogen. This stabilization may be physical or chemical in nature and is determined by a balance of intermolecular forces existing between the environment of a hydrogen storage site and atomic hydrogen. The stabilization may include covalent bond formation, ionic bond formation, dative bond formation, electrostatic interactions, or intermolecular interactions such as van der Waals interactions. The nature of the stabilizing interaction influences the binding strength of hydrogen to a hydrogen storage site. Materials that stabilize hydrogen through direct bond formation generally have high binding strengths, whereas materials that stabilize hydrogen electrostatically generally have lower binding strengths.

Electron density at the hydrogen storage site is a fundamental property that underlies the binding strength of atomic hydrogen. Hydrogen storage sites that exhibit high electron density tend to bind atomic hydrogen strongly and exhibit high heats of formation. In a limiting case, sufficient electron density is available to permit formation of a metal-hydrogen bond at a single metal atom of the hydrogen storage alloy. While this limiting case may lead to high hydrogen storage density if sufficient sites are available, it also leads to strong binding of hydrogen, difficulties in liberating hydrogen during discharge and a requirement for high discharge temperatures. As the available electron density decreases, it becomes more difficult and ultimately impossible to form a direct metal-hydrogen bond and as a result, the binding strength of atomic hydrogen decreases and the heat of formation is reduced. At electron densities below those needed for formation of a direct metal-hydrogen bond, stabilization of atomic hydrogen typically occurs over two or more metal atoms where each of the two or more atoms has insufficient electron density to stabilize atomic hydrogen independently, but sufficient electron density to stabilize atomic hydrogen in combination with electron density available from neighboring atoms. Atomic hydrogen may bridge or otherwise be stabilized by two or more metal atoms. The mechanism of binding becomes less chemical and more physical in nature as bond formation becomes less important and electrostatic and intermolecular forces become more important.

The binding energy of atomic hydrogen may be conceptually viewed in terms of a potential energy landscape that is characteristic of a hydrogen storage alloy. This potential energy landscape represents the spatial distribution of the binding energy of atomic hydrogen as a function of position within a hydrogen storage alloy. Examination of the potential energy landscape reveals a series of potential wells that correspond to hydrogen storage sites. The depth of the potential well associated with a hydrogen storage site is a measure of the binding strength of the site, while the width of the potential well is a measure of the spatial extent of the site. The depth and width of a potential well are reflections of the local electron density available for stabilizing hydrogen. Hydrogen storage sites that form direct metal-hydrogen bonds typically have deep and narrow potential wells that reflect the high binding strength and spatially localized nature of the metal-hydrogen bond formation mechanism of stabilization. As the available electron density decreases and stabilization occurs over a greater number of atoms, the potential well of a hydrogen storage site becomes wider and shallower.

The ability of a hydrogen storage site to retain atomic hydrogen depends on the depth of the potential well of the site and the thermal energy available to atomic hydrogen. The depth of a potential well corresponds to an activation barrier to motion of hydrogen trapped in the well and the available thermal energy is a measure of the ability of atomic hydrogen to overcome this activation barrier. Upon its formation, atomic hydrogen migrates through the hydrogen storage alloy and interacts with the potential energy well of one or more hydrogen storage sites. When the hydrogen encounters a potential well, its motion slows as it is trapped by the potential well. Spatially, the hydrogen is located at the minimum of the potential well and has a stabilization or binding energy that correlates with the depth of the potential well. The depth of the potential well presents an activation barrier to movement of the trapped hydrogen away from the hydrogen storage site. In order to move, the thermal energy available to the trapped hydrogen must be sufficient to overcome the activation energy of the hydrogen storage site. If the trapped hydrogen overcomes the activation barrier, it continues to migrate through the hydrogen storage alloy until it is trapped at another hydrogen storage site or reacts at a catalytic site. If the thermal energy available to trapped hydrogen is insufficient, the trapped hydrogen remains at the site and becomes stored at the site. Stored hydrogen can be released by increasing the temperature to make additional thermal energy available to the stored hydrogen. The additional thermal energy allows the stored hydrogen to overcome the activation energy of the potential well. The amount of additional thermal energy required depends on the depth of the potential well.

From the viewpoint of the potential energy landscape, the design goal of releasing hydrogen at lower temperatures corresponds to creating hydrogen storage sites having potential wells with binding energies that permit the release of stored hydrogen at a preferred operating temperature. This goal requires creating hydrogen storage sites having shallower potential wells relative to existing hydrogen storage alloys. Decreasing the binding energy of a hydrogen storage site requires a reduction in the electron density that provides the stabilization necessary to store atomic hydrogen. In conventional hydrogen storage alloys, the electron density is varied by varying the chemical composition of the alloy. Different metal atoms have differing numbers of electrons, differing valence orbital occupancies and form bonds of different strength and orientation to other metal atoms. By combining metal atoms in unique ways to form new alloys, it becomes possible to exercise a degree of control over electron density and the binding energies of hydrogen storage sites in equilibrium hydrogen storage alloys.

The instant materials represent a new class of hydrogen storage materials that include a fundamentally new type of hydrogen storage site that can be readily configured to provide a binding energy suitable for releasing hydrogen at any desired operating temperature. A characteristic feature of the hydrogen storage sites of conventional hydrogen storage alloys is the dominant presence of hydrogen storage sites in the bulk, as opposed to surface, phase of the alloy. The binding energies of the hydrogen storage sites are accordingly determined by the bulk properties of the hydrogen storage alloy. The bulk phase properties of a material are the properties that a material exhibits in the macroscopic regime. In practical terms, the macroscopic regime of most materials is reached for length scales beyond a few hundred to several hundred angstroms. Bulk material properties are the properties manifested by a large ensemble of atoms.

In the hydrogen storage sites of conventional hydrogen storage alloys, the binding energies associated with the potential wells are a consequence of the bulk properties of the hydrogen storage alloy. Extended metal-metal bonding and the formation of a metallic band structure are bulk characteristics of existing hydrogen storage alloys that influence the potential wells of hydrogen storage sites. A metallic band structure is the result of the metallic bonding that occurs when a bulk ensemble of metal atoms comes together to form a solid. A metallic band structure is characterized by empty, but readily accessible, conduction band states that correspond to spatially extended molecular orbitals. The molecular orbitals are quantum mechanical combinations of valence atomic orbitals of the individual atoms of the bulk ensemble of atoms that combine to form the hydrogen storage alloy. Since the conduction band states are essentially delocalized over the entire material, an electron promoted from any metal atom to the conduction band is essentially shared by all atoms. This is a characteristic feature of metallic bonding. In the context of hydrogen storage sites, a metallic band structure has the effect of deepening potential wells and increasing the binding energy of stored hydrogen. These effects are a consequence of the large number of metal atoms that influence the electron density present at a hydrogen storage site through the extended conduction band states. Metallic bonding leads to a sharing of electron density over large distances.

In order to reduce the number of metal atoms that influence a particular hydrogen storage site, the instant inventors have reasoned that it is necessary to disrupt the metallic bonding that is characteristic of the hydrogen storage sites of existing hydrogen storage alloys. Since metallic bonding is a consequence of extended metal-metal bonding over macroscopic length scales, the instant inventors have further reasoned that a reduction in the number of atoms influencing or surrounding a hydrogen storage site provides a new degree of freedom in controlling the binding energy of hydrogen storage sites. More specifically, if the number of atoms can be reduced to the extent that bulk properties are not manifest, then the extended metal-metal bonding required for metallic bonding cannot occur and the electron density at a hydrogen storage site is reduced. The binding energy of the site can therefore be reduced.

The extent to which the binding energy of a hydrogen storage site can be reduced depends on the extent to which metallic bonding is inhibited or precluded. In order to disrupt metallic bonding, it is necessary to create aggregates of metal atoms having length scales that are insufficient to permit attainment of bulk phase properties. The instant materials are comprised of an assembly of atomic aggregations having length scales in the quantum regime. The quantum regime is a sub-macroscopic regime characterized by atomic aggregations having length scales on the order of a few angstroms to several tens of angstroms. The quantum limit corresponds to a unique state of matter having electronic, chemical, physical or other properties not found in the macroscopic limit. Quantum scale aggregations possess structural degrees of freedom not available in macroscopic scale aggregations due to a lifting of the constraints imposed in the macroscopic limit. Due to a relaxation of structural constraints, quantum scale aggregations are able to adopt structural configurations not available in macroscopic materials. Deviations from the bond angles, bond lengths and other structural variables that are standard in conventional materials become possible in the quantum limit.

Atomic aggregations in the quantum limit are able to adopt a wider range of structural configurations due to diminishment of structural rigidity that occurs as the number of atoms in an aggregation is reduced. This greater topological flexibility results from a reduction in the resistance to structural rearrangement and distortions as the number of atoms in an aggregation is reduced. A large number of atoms imposes constraints on the topology and range of structures available for a material due to the need to mutually satisfy the bonding requirements of each of the atoms in the aggregation. The structure of continuous atomic aggregations must also be space filling and this requirement also constrains the allowed configuration of atomic aggregations. Although amorphous materials show greater flexibility and diversity in local structure than crystalline materials, conventional amorphous materials are nonetheless spatially extended over macroscopic length scales, require space filling as well as mutual satisfaction of local bonding requirements of a large number of atoms and thus do not permit full realization of the range of structural configurations available to smaller assemblages of atoms.

The space filling and bonding requirements of macroscopic scale materials underlie the ubiquitous occurrence of the familiar linear, trigonal, tetrahedral, octahedral etc. bonding configurations of atoms in materials. In the absence of defects, deviations from regular bonding occur to some extent in the amorphous phase, but to a greater extent at the surface of a material. Surface atoms are partially unbonded due to the absence of atoms beyond the surface of a material. Surface atoms are accordingly bonded to fewer atoms than interior or bulk atoms of a material and therefore exhibit greater diversity in structure and bonding. Configurational parameters such as bond angles, bond lengths, hybridization, coordination number etc. vary over a wider range for surface atoms than bulk atoms and greater richness in topology and properties occurs as a result. As the number of surface atoms relative to bulk atoms increases for an aggregation of atoms, the structural diversity and structural degrees of freedom available increases. In one viewpoint, the quantum limit may be viewed as a limiting structural configuration in which atomic aggregations approach or achieve configurations in which most or all atoms are surface atoms. The structural flexibility and variability in structural configuration increases accordingly.

In addition to and in concert with new structural degrees of freedom, the quantum limit also provides mechanisms for controlling or regulating the quantity and spatial distribution of electron density in the vicinity of catalytic sites. The greater ability to control structural configurations of atomic aggregations in the quantum limit provide a mechanism for modifying electron density at catalytic sites, thereby permitting unprecedented control over catalytic properties. The quantity and distribution of electron density within a catalyst and at catalytic sites ultimately originates from the wavefunctions and overlap thereof associated with the orbitals of the constituent atoms in an aggregation of atoms. The quantity and distribution of electron density at particular points such as catalytic sites within a catalytic material can be modified through electronic interactions that may occur between or among atoms. In quantum mechanical terms, the electronic interactions between atoms of a catalyst may be described in terms of an overlap of wavefunctions. The catalytic sites of a catalytic material are collections of atoms that are chemically bonded or physically connected where the electron density of each atom is describable by one or more wavefunctions. The electronic interaction present in the instant materials corresponds to the development of an overlap between wavefunctions of two or more atoms within the instant quantum limit aggregations.

The general effect of electronic interaction through wavefunction overlap between atoms comprising the instant quantum limit aggregations is to perturb, redistribute or otherwise modify the magnitude and distribution of electron density. The specific effect of the electronic interaction present between the atoms depends on the strength and nature of the overlap of wavefunctions. As is known in quantum mechanics, the overlapping of wavefunctions (e.g. superpositions or combinations) may lead to the formation of bonding and/or anti-bonding orbitals. Bonding orbitals typically lead to an increase in electron density in the space between the interacting atoms associated with the overlapping wavefunctions. Such a bonding type electronic interaction results in a delocalization of electron density from one or more of the interacting atoms to others of the interacting atoms or to the space between the interacting atoms.

Anti-bonding orbitals formed by overlapping wavefunctions typically lead to a decrease in electron density in the space between the interacting atoms associated with the overlapping wavefunctions. Such an anti-bonding type electronic interaction prevents delocalization of electron density to the region between the interacting atoms associated with the overlapping wavefunctions. Instead, a repulsive type effect results that leads to a reduction in the spatial extent of electron density emanating from one or both of the interacting atoms. Electron density residing in the interacting atoms becomes more localized and leads to an increase in electron density in the vicinity of the interacting atoms relative to a situation in which no anti-bonding electronic interaction is present.

In the instant quantum limit catalysts, electronic interaction due to wavefunction overlap may occur in which electron density delocalizes from or localizes on one or more catalytic sites. Modification of electron density may occur through the bonding or anti-bonding mechanisms as described hereinabove as well as through donor-acceptor type electronic interactions or tunneling type electronic interactions. A donor-acceptor interaction is an interaction between orbitals or wavefunctions of atoms within an atomic aggregation in which at least one of the interacting wavefunctions is unoccupied or only partly occupied. A donor-acceptor interaction is one in which electron density is transferred from the donor to the acceptor where the acceptor receives the transferred electron density in a partially occupied or unoccupied orbital. Tunneling is a quantum mechanical process in which electron density delocalizes from one atom to another through penetration of an energy barrier. Tunneling is the basis of well-known effects such as field emission and scanning tunneling microscopy and is a consequence of the quantum mechanical tendency for electron density to extend beyond the physical boundaries of atoms.

The catalytic properties of a catalytic site are largely determined by the distribution of electron density at or near the site. Catalytic functionality requires an ability of catalytic sites to attract and stabilize one or more reactant species for a period of time sufficient to permit a chemical reaction or molecular rearrangement to occur. The electron density at or near the catalytic site influences the strength of interaction between the catalytic site and potential reactants and also influences factors such as the geometric position or orientation of a reactant on the surface of a catalytic material.

The electronic interactions present in the instant quantum limit materials provide new degrees of freedom for modifying the distribution of electron density at or near catalytic sites. The strength and type (e.g. bonding, anti-bonding, donor-acceptor, tunneling) of the electronic interaction in the quantum limit ultimately depends on the extent and nature of wavefunction overlap between the atoms comprising a quantum limit aggregation. The extent and nature of overlap depend on several factors. First, the spatial extent of the wavefunctions associated with the electron density of interacting atoms influences the extent of overlap. Of particular relevance is the extent to which the wavefunctions contributing to the overlap extend beyond the physical boundaries of the interacting atoms. Tightly bound electron density is described by wavefunctions that are essentially contained within the boundaries of the aggregate of atoms from which the wavefunctions originate. Such wavefunctions show little tendency to spatially overlap wavefunctions originating from nearby aggregates of atoms.

Atoms whose wavefunctions extend beyond the physical boundaries of the aggregate of atoms from which the wavefunctions originate, in contrast, show greater tendency to exhibit the spatial overlap or barrier penetration necessary to provide the electronic interaction of the instant invention. Generally speaking, wavefunctions associated with electron density corresponding to higher energy occupied atomic and/or molecular orbitals are more spatially extensive than wavefunctions associated with lower energy orbitals. As orbital energy decreases, electrons on atoms become more tightly bound and interact to a lesser degree with electrons on neighboring atoms. Wavefunctions showing greater spatial extent are also more likely to participate in tunneling interactions than wavefunctions that are tightly bound.

A second factor contributing to the extent and nature of wavefunction overlap is the relative orientation of the interacting wavefunctions of the atoms comprising the instant quantum limit atomic aggregations. Wavefunctions are typically spatially non-isotropic and have characteristic directionality and reflect asymmetries of electron density. Even if wavefunctions show great spatial extent, the regions of space occupied by the wavefunctions of interacting must be co-extensive in order to create spatial overlap and to produce the electronic interaction of the instant invention. The requirement for spatial co-extensiveness is tantamount to a directionality or wavefunction orientation requirement. Wavefunction directionality is also relevant to tunneling since electron density that penetrates a barrier must delocalize onto adjacent atoms through the occupation of orbitals.

The structural flexibility provided in the quantum limit increases the likelihood of achieving wavefunction directionality conducive to spatial overlap and tunneling. The directionality of wavefunctions is intimately connected with the structure of a group of atoms. A mutual dependence exists between the structural configuration of a group of atoms and wavefunction directionality since the spatial orientation of wavefunctions is characteristic of the bonding scheme that occurs between the atoms of an atomic aggregation. By providing new degrees of freedom in atomic configuration and topology, the quantum limit provides for wavefunction orientations not possible in conventional macroscopic scale materials and therefore provides for the creation or modification of wavefunction overlap and/or tunneling not otherwise possible. Novel catalytic properties accordingly result.

A third factor contributing to the extent and nature of wavefunction overlap is the relative energy of the interacting wavefunctions of the atoms comprising the instant quantum limit aggregations. It is known from quantum mechanics that the relative energies of wavefunctions having adequate spatial extent and suitable orientation influences the strength of interaction between the wavefunctions and the resulting effect on electron density. The closer in energy the interacting wavefunctions are, the stronger is their strength of interaction. Wavefunctions having identical or similar energies show stronger interactions than wavefunctions having dissimilar energies. A stronger electronic interaction between wavefunctions indicates a greater degree of mixing of wavefunctions from the catalytic phase and the support matrix to provide a new wavefunction that better reflects a combination of the properties of the properties of interacting atoms. As the mismatch in energy between contributing wavefunctions increases, mixing may still occur, but the resulting wavefunctions exhibit characteristics that are predominantly controlled by the wavefunctions of the individual contributing atoms.

A fourth factor contributing to the extent and nature of wavefunction overlap is the relative phases of the interacting wavefunctions. The wavefunction phase can be positive or negative and the relative phases of the wavefunctions of the interacting atoms influences whether the electronic interaction is, for example, of the bonding type or anti-bonding type. Wavefunctions having the same phase interact to provide a new wavefunction of the bonding type and result in a bonding-type electronic interaction between the atoms of a catalytic site. Wavefunctions having opposite phase interact to provide a new wavefunction of the anti-bonding type and result in an anti-bonding type electronic interaction between atoms of a catalytic site.

One or more catalytic properties may be improved through the electronic interactions present in the quantum limit atomic aggregations of the instant materials. These catalytic properties include reaction rate, overall catalytic activity, selectivity, range of catalytically affected reactants, and the range of environmental conditions under which catalytic effects are observed. Overall catalytic activity refers to the rate of reaction and/or the conversion efficiency of a catalyst. Selectivity refers to the ability of a catalyst to discriminate among potential reactants when in the presence of a plurality of reactants. Oftentimes a catalytic reaction is preferentially completed on a particular component within a mixture of components. Range of catalytically affected reactants refers to the range of chemical species that undergo a catalyzed reaction in the presence of a catalyst. Catalysis of a particular species may become possible through the electronic interaction of the instant materials where said species was not catalyzed by the same catalytic phase in the macroscopic limit. The range of environmental conditions refers to external conditions such as temperature, pressure, concentration, pH, etc. under which a particular catalytic reaction may occur. The electronic interaction of the instant quantum limit catalyst may facilitate catalytic function at conditions that are more convenient than those for the corresponding reaction in the presence of a conventional catalyst in the macroscopic limit. The reaction temperature, for example, may be lowered through use of the instant catalytic materials. Similarly, the catalytic activity at a particular temperature may be greater for a particular reaction through use of the instant quantum limit catalytic materials. Of particular note in the context of the instant invention is the possibility of inducing a catalytic effect in a catalytic phase where said catalytic phase exhibits no catalytic activity with respect to a particular reaction or process at a particular set of conditions in the macroscopic limit. Electrochemical, chemical, thermal, bond cleavage, bond formation, rearrangements, isomerizations and other types of reactions are within the scope of the instant invention.

In terms of hydrogen storage materials, the new structures achievable in the quantum limit lead to novel distributions of electron density and provide hydrogen storage sites having binding energies that provide lower desorption (release) or absorption (uptake) temperatures and/or faster desorption or absorption kinetics at a particular temperature relative to conventional hydrogen storage materials. The binding energy of a storage site may be reduced in the quantum limit in a number of ways. In one embodiment, the bond length between adjacent metal atoms in the instant materials is increased in the quantum limit relative to the bond length of the corresponding bond in the macroscopic limit. A longer bond length leads to a dilution of electron density and a weakening of the interaction of the bond with hydrogen due to an enlargement of the volume occupied by the electrons in the bond. As a result, the strength of interaction between the storage site and atomic hydrogen decreases. In another embodiment, the bond angles between neighboring atoms are increased or decreased relative to corresponding bond angles in the macroscopic limit. Deviations in bond angles lead to a reduction in the extent of orbital overlap, a reduction in bond strength and rearrangement of electron density away from a hydrogen storage site. As a result, the interaction strength of the bond with atomic hydrogen decreases. In another embodiment, the instant materials include bonds between metal atoms that are unable to bond in conventional hydrogen storage materials due to structural limitations imposed in the macroscopic limit.

The instant quantum limit hydrogen storage materials include materials that have catalytic sites and hydrogen storage sites. The catalytic and hydrogen storage sites may be contained within a common atomic aggregation, different atomic aggregations or a combination thereof. The catalytic sites may be included in atomic scale aggregations or macroscopic scale aggregations. In the latter scenario, the instant materials include macroscopic catalytic regions in combination with quantum scale atomic aggregations for hydrogen storage where the catalytic regions may be of the same or different chemical composition than the hydrogen storage regions. Catalytic properties of hydrogen storage materials may include rate of hydrogen absorption or desorption as well as hydrogen storage capacity.

The instant catalytic and hydrogen storage materials preferably comprise transition metals, rare earth metals or a combination thereof. Single element as well as multi-element atomic aggregations in the quantum limit are within the scope of the instant invention. Preferred embodiments include quantum limit materials comprised of Ni or Ni alloy, Mg or Mg alloy, V or V alloy, Co or Co alloy, or Mn or Mn alloy.

In order to best realize the benefits of the quantum limit, the atomic aggregations of the instant materials preferably are metal or metal alloys in the form of particles having a size of 100 Å or less. More preferably, the catalytic metal or metal alloy particles have a size of 50 Å or less. Most preferably, the catalytic metal or metal alloy particles have a size of 20 Å or less. As described hereinabove, as the size of a catalytic atomic aggregation decreases, the structural flexibility increases and new structural configurations result that reflect and provide novel distributions of electron density at catalytic sties through electronic interactions resulting from wavefunction overlap, wavefunction directionality and/or tunneling effects not achievable in the macroscopic limit.

The instant quantum limit alloys may be viewed as virtual alloys in the sense that although they are comprised of chemical elements that are currently used in conventional catalytic materials, the novel structures, topologies and configurations available in the quantum limit provide for distributions of electron density, electronic interactions, wavefunction overlap and wavefunction directionality not achievable in the macroscopic limit. Since the spatial distribution of electron density and the orientation of orbitals constitute the essence of what a chemical element is, the modifications in electron density and wavefunction characteristics of atoms provided by the instant invention are tantamount to the creation of "new" chemical elements. These "new" chemical elements are virtual elements that are produced through the manipulations of the local environment that occur in the quantum limit and constitute an extension of Ovshinsky's principle of total interactive environment discussed hereinabove. The instant materials exploit the new chemical and physical effects attainable through the combining of virtual elements to form virtual alloys having heretofore unachievable catalytic properties.

A further aspect of the virtual alloy concept is the possibility of forming alloy compositions that cannot be formed in macroscopic scale materials. It is well known in conventional materials that there are limitations on the chemical compositions of alloys. Chemical bonds do not ubiquitously form between arbitrary pairs or collections of atoms. Instead, bonding is element specific and each element preferentially bonds with certain elements and is unable to bond with other elements. Bonding preferences are dictated by the electronic interactions and wavefunction characteristics of the elements. Since the virtual elements created in the quantum limit possess non-conventional electronic interactions, wavefunction characteristics, and electron density perturbed in magnitude or spatial distribution relative to conventional elements, the materials of the instant invention provide for the formation of chemical bonds between pairs or combinations of elements that are unable to bond in the macroscopic limit. Thus, in addition to modified structural and electronic properties, the catalytic materials of the instant invention further provide for chemical compositions that are not possible in the macroscopic limit.

As indicated hereinabove, the catalytic phase of the instant supported materials are preferably metals or metal alloys in the form of particles. More preferably, the catalytic particles comprise a transition metal and most preferably the catalytic particles comprise Ni. Transition metals are preferred because their valence electronic structure includes d-orbitals. As previously described by the instant inventor, d-orbitals provide for chemical modification effects through the concept of total interactive environment that lead to novel electronic environments in hydrogen storage materials. Further discussion of the concepts of chemical modification and total interactive environment may be found in the co-pending parent application (U.S. patent application Ser. No. 10/405,008) as well as in U.S. Pat. Nos. 4,431,561; 4,623,597; 5,840,440; 5,536,591; 4,177,473; and 4,177,474 of which the instant inventor is a co-inventor; the disclosures of which are herein incorporated by reference. In the instant invention, the concept of total interactive environment is extended to supported catalytic materials through the electronic interaction between the catalytic phase and support matrix due to wavefunction overlap as described hereinabove d-orbitals facilitate wavefunction overlap because they are generally spatially well extended and are capable of hybridizing in many ways to achieve a variety of different spatial orientations. Transition metals thereby facilitate the establishment, activation or inducement of the electronic interaction of the instant materials.

The instant quantum limit catalytic and hydrogen storage materials may be prepared in several ways. In one embodiment, an ultrasonic preparation is used. In this embodiment, sound waves are used to induce sonochemical reactions of starting materials. Sonochemistry is method whereby sound waves are used to drive an acoustic cavitation effect that induces chemical reactions. Acoustic cavitation refers to a process involving the formation, growth and collapse of bubbles in a liquid phase medium. Bubble collapse is the driving force behind sonochemistry because bubble collapse is accompanied by intense local heating and high pressures over short time scales. The positions at which bubble collapse occurs may be viewed as local hot spots in the liquid phase reaction medium. It is at these hot spots that reactions occur. Representative conditions at the hot spots include temperatures of up to several thousand degrees, pressures of up to hundreds to thousands of atmospheres (comparable to pressures at the deepest points of an ocean), and heating and cooling rates on the order of up to a billion degrees per second. The actual conditions depend on the intensity and frequency of sound waves employed in a sonochemical process. The extreme conditions are a consequence of the channeling or localization of the energy of sound waves locally at the hot spots and it is these extreme conditions that are responsible for the wide variety of chemical reactions possible in a sonochemical process. Sonochemical reactions may be completed in a homogeneous liquid phase, heterogeneous liquid phase (e.g. liquid phase suspensions or incompletely miscible liquids), or heterogeneous liquid-solid systems (e.g. slurry).

Sonochemical reactions are preferably completed in a homogeneous liquid phase medium or slurry. Typically, one or more precursors (reactants, starting materials) is dissolved in a solvent and the mixture is sonicated (subjected to sound waves). Since the primary sonochemical reaction site is in the vapor phase of a bubble, it is preferable for the precursors to have a high vapor pressure and for the solvent to have a low vapor pressure. These conditions insure that the bubbles formed upon sonication contain, to the maximum extent possible, precursors, rather than solvent, and lead to higher sonochemical reaction efficiencies.

In the preparation of the instant quantum limit catalytic and hydrogen storage materials, the preferred sonochemical precursors are organometallic compounds. These compounds include one or more transition metals that are coordinated by one or more ligands. Virtually any soluble organometallic precursor is suitable for reaction in a sonochemical process. Representative organometallic precursors include metal carbonyls, metal alkyls, metal cyclopentadienyl compounds, and metal nitrosyls. In the sonochemical reaction of these precursors, sonication leads to the decomposition of the precursor through cleavage of metal-ligand bonds to liberate metal atoms that subsequently agglomerate to form the quantum scale atomic configurations of the instant materials. In the instant invention, individual precursors may be sonicated to obtain product materials that include quantum scale aggregates of a single metal (quantum scale metals) or combinations of precursors may sonicated to obtain quantum scale metal alloys. Preferred solvents are those having high boiling points (e.g. long chain alkanes or alcohols).

In another embodiment, the instant quantum limit catalytic and hydrogen storage materials are prepared through reduction reactions of metal salts. In these reactions, metal salts are precursors that are used to provide the metal atoms for a quantum limit metal or metal alloy. The metal salt precursors include metals in oxidized form that become reduced during reaction with a reducing agent to form neutral metal atoms that agglomerate to form the angstrom scale aggregations characteristic of the instant quantum limit materials. Alloy formation occurs through the simultaneous reduction of two or more metal salts.

In a typical reaction, one or more metal salts are reacted with a reducing agent in a liquid phase solvent. Metal salts include salts that are soluble, insoluble or partially soluble in the solvent. Representative metal salts include halides, nitrates, sulphates, phosphates etc. In a preferred embodiment, metal chlorides are used metal precursors. Preferred reducing agents include borohydrides or organoborates (e.g. hydrotriorganoborates such as $NaB(C_2H_5)_3H$). Preferred solvents are liquids in which the reducing agent is at least partially soluble.

In yet another embodiment, the instant quantum limit catalytic and hydrogen storage materials are prepared in a thermal decomposition process. In this embodiment, a molecular precursor containing one or more metal atoms is thermally decomposed to liberate metal atoms that subsequently agglomerate to form quantum scale atomic aggregates. Preferred precursors are molecular systems having low decomposition temperatures. Organometallic precursors, for example, are desirable precursors because they include organic ligands that fragment under mild heating conditions. Metal-carbon and metal-nitrogen bonds, for example, typically cleave thermally at temperatures of 100-200° C. Representative organometallic precursors include metal alkyls, metal chelates, metal amines, metal aryls etc.

In the thermal decomposition process, an organometallic precursor compound may be heated to decomposition in either a closed container or a flow reactor. In one embodiment, the precursor is a solid that is sublimed to form a gas phase reactant that subsequently decomposes thermally. The sublimed precursor is typically diluted with a carrier gas in a continuous flow process or decomposed in a gas ambient in a closed reactor. The precursor may also be diluted with an organic compound. In the thermal decomposition reaction, the organometallic precursor decomposes to form a solid metal or metal alloy product along with one or more gas phase products (e.g. $H_2$, $N_2$, $CO$, $CO_2$, $NO$ etc.) and sometimes a solid carbonaceous product. Multiple precursors that contain different metals or ligands may be reacted simultaneously. The reaction conditions of the decomposition process can be designed to control the size and distribution of quantum scale aggregates within the instant materials.

EXAMPLE 1

In this example, the preparation and properties of a quantum limit iron catalyst is described. The catalyst includes atomic aggregations of Fe and is prepared using sonochemical synthesis. Iron carbonyl ($Fe(CO)_5$) was used as the iron precursor. 19.5 g of iron carbonyl was placed in 80 mL of decahydronaphthalene (Decalin) in a beaker and subjected to sonication. The iron carbonyl was protected from air and the sonication was completed in a dry box under a nitrogen atmosphere. A 750 W sonicator operating at 75% intensity was used to provide the ultrasound used in the synthesis. Sonication occurred for 8 hours using a 50% duty cycle (ultrasound was alternated on and off in equal time intervals over the 8 hours). Upon termination of the reaction, 0.5 g of quantum limit iron product was recovered. The product was analyzed using X-ray diffraction (XRD) and found to consist of aggregations of Fe having an average size of 16-20 Å.

The hydrogen absorption and desorption characteristics of the quantum limit Fe obtained in the sonochemical synthesis were investigated in a PCT (pressure-composition-temperature) experiment. The PCT measurement was completed at 90° C. Two samples were compared. A first sample was a control sample that consisted of an Mg based hydrogen storage alloy. A second sample was a mechanical alloy (MA) of the control sample with 0.50 wt. % of the quantum limit Fe.

The control sample was an alloy comprising primarily Mg and Ni and smaller amounts of other transition metals and boron. The control sample was prepared by combining raw materials representing the desired alloy composition in a boron nitride crucible within a melt spinning chamber. Since Mg is volatile at high temperatures, excess magnesium was added in an amount necessary to compensate for evaporative losses. The crucible temperature was ramped up to a temperature over 1000° C. over a time period of about 40 minutes to form a melt. A plug at the bottom of the crucible was subsequently removed to allow the melt to flow from the crucible toward a high speed, water-cooled Be-Cu alloy melt-spinning wheel rotating at a linear speed of about 10 m/s. The melt is quenched and solidified to form ribbons of the alloy material when it hits the wheel. The ribbons of the alloy were collected and allowed to cool for more than 12 hours. After cooling, the alloy was transferred under a protective argon atmosphere to an attritor for mechanical alloying. Graphite and heptane were included as grinding aids and grinding was performed for two hours to form the control sample of this experiment. A second sample was prepared in a similar manner except that quantum limit Fe was added to the attritor for the last ten minutes of grinding.

Figure 1:
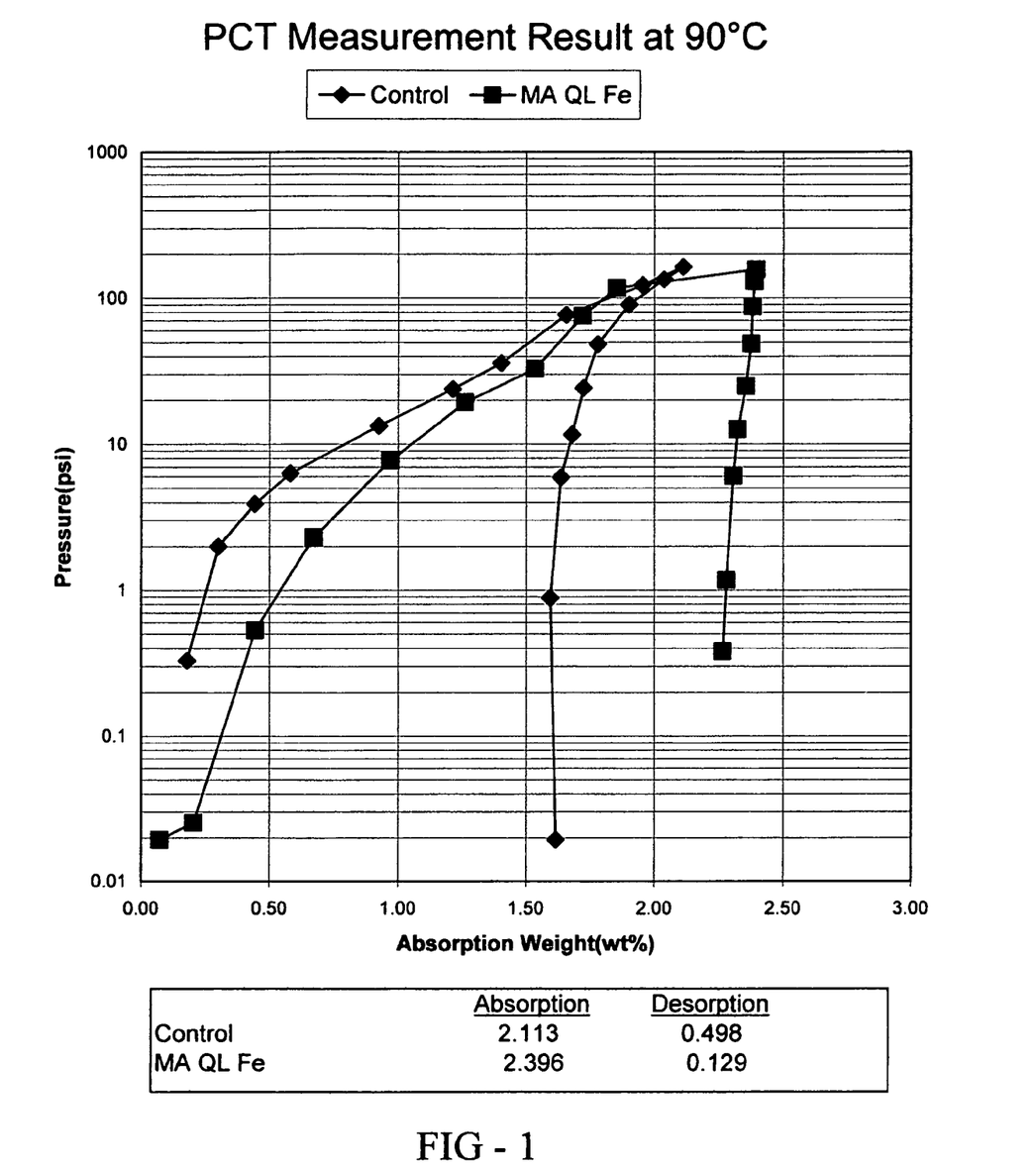
FIG. 1. PCT measurements of four samples of a hydrogen storage alloy. One sample was a control sample and three samples were mechanical alloys of the control sample with a quantum limit catalyst according to the instant invention.

PCT curves for the two samples on absorption and desorption of hydrogen were measured using a standard PCT apparatus. The results of the experiment are shown in FIG. 1, where MA QL Fe refers to the mechanical alloy of the control sample with quantum limit Fe as described above. The results for each sample are denoted with different symbols, as indicated in the legend. The plot shows the hydrogen pressure as a function of absorption wt. % where absorption wt. % is a measure of the amount hydrogen absorbed by the sample. The general appearance of the data curves for each of the samples is similar and each data curve consists of a hydrogen absorption portion and hydrogen desorption portion. The hydrogen absorption portion is an upward sloping curve beginning near 0 wt % and continuing up to an approximate saturation point as the absorption wt. % increased. After saturation, desorption was initiated. The desorption portion of the data curves begins at the saturation point and slopes downward in the direction of decreasing absorption wt. %. The hydrogen absorption wt. % and hydrogen desorption wt. % for each sample are reported in table form below the data plot. The reported hydrogen absorption wt. % of each sample corresponded to the approximate saturation point and the reported hydrogen desorption wt. % of each sample corresponded to the amount of hydrogen lost and was measured as the difference in absorption wt. % between the saturation point (initial point of the desorption portion of the data curve) and the terminal point of the desorption curve.

The experimental results show that inclusion of quantum limit Fe in the hydrogen storage material improved the hydrogen absorption relative to the control sample. The wt. % absorbed hydrogen increased from 2.113 for the control sample to 2.396 for the mechanical alloy of the control sample with the instant quantum limit Fe catalyst. The higher hydrogen absorption is a consequence of the greater overall catalytic activity provided by the quantum limit Fe relative to a Fe catalyst in the macroscopic limit. The quantum limit Fe facilitates the catalytic dissociation reaction of hydrogen gas to form atomic hydrogen for storage and/or provides a greater concentration of hydrogen storage sites. Inclusion of quantum limit Fe did not benefit the desorption characteristics of the material in this experiment, however. The wt. % desorbed hydrogen decreased from 0.498 wt. % to 0.129 wt. % upon inclusion of the quantum limit Fe.

This example shows that the instant quantum limit Fe facilitates the hydrogen absorption properties of a hydrogen storage material.

EXAMPLE 2

In this example, the preparation and properties of a quantum limit Mg catalyst are described. Conventional Mg is a well known hydrogen storage material that provides a particularly high hydrogen storage capacity due to strong bonds between Mg and H. The practical difficulty associated with conventional Mg is its poor hydrogen release (desorption) characteristics. Because of the high Mg-H bond strength, it is difficult to remove hydrogen from the storage sites of conventional Mg and accordingly high desorption temperatures are required.

The instant Mg catalyst was prepared through a thermal decomposition reaction. Mg(anthracene)·2THF was used as the Mg precursor. The precursor was an orange solid. 5.8 g of the precursor were sublimed under vacuum. At a temperature of ca. 40° C., the THF was liberated from the precursor and at a temperature of ca. 150° C., anthracene was sublimed to leave a fine Mg black powder. Analysis of the sublimation process indicated that 2.2 g anthracene were produced and ca. 0.5 g of the Mg catalyst product was obtained. XRD analysis of the Mg catalyst indicated that it consisted of atomic aggregations of Mg having an average size of 40 nm. This size is much smaller than the ca. 1 micron size Mg particles used in conventional ball-milled Mg catalysts.

Figure 2:
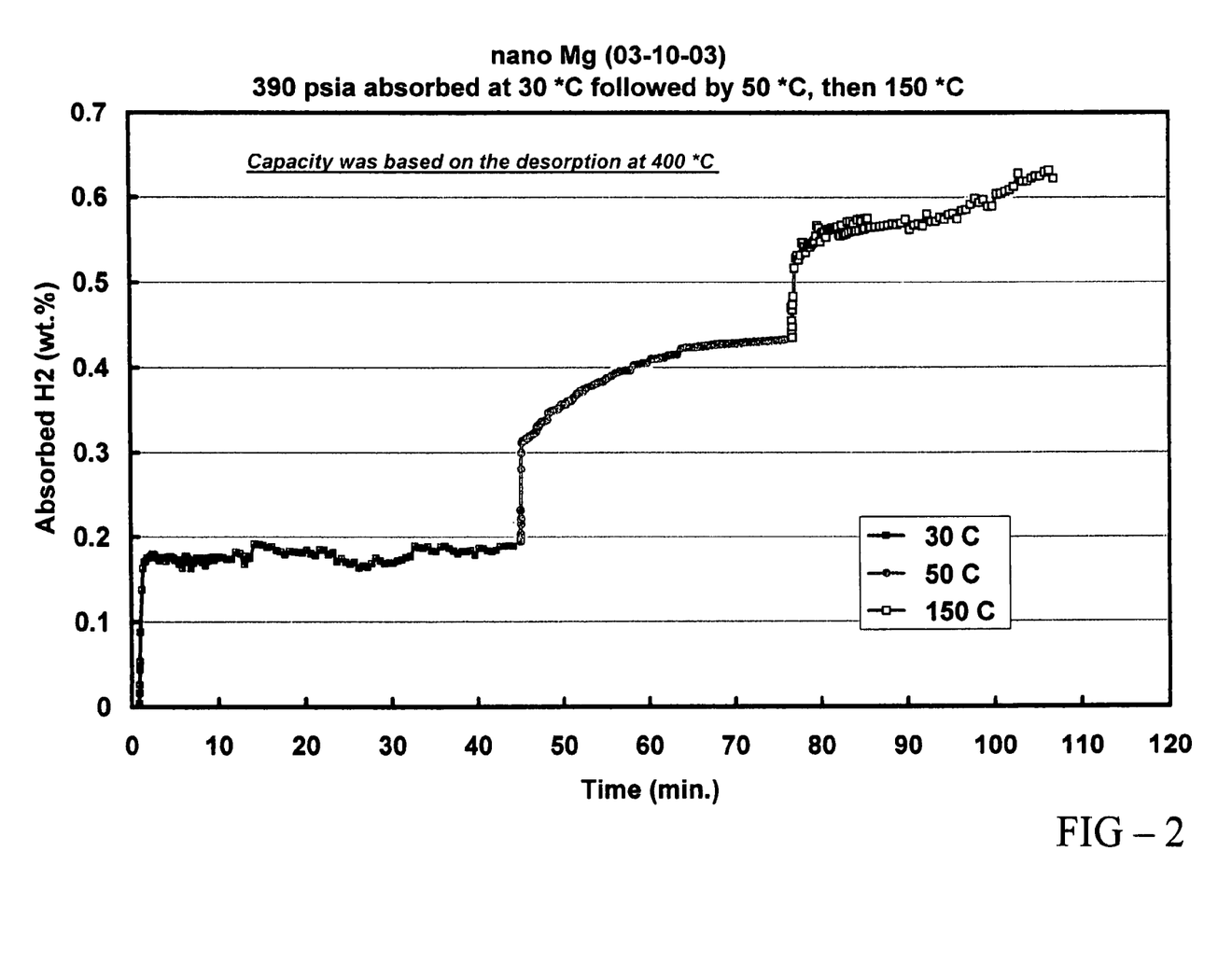
FIG. 2. Hydrogen absorption characteristics of a Mg catalyst according to the instant invention at 30° C., 50° C., and 150° C.

The hydrogen absorption and desorption characteristics of the Mg catalyst were determined. A noteworthy feature of the experiments is that the Mg catalyst was employed directly in an unactivated state. Due to otherwise poor absorption and desorption kinetics, conventional Mg is used in an activated state. Although activation improves the kinetics, it is preferable to avoid activation since it adds additional processing steps in catalyst preparation. FIG. 2 shows the hydrogen absorption characteristics of the Mg catalyst at three different temperatures. FIG. 2 shows the wt. % absorbed hydrogen as a function of time for temperatures of 30° C., 50° C., and 150° C. In the measurements, a sample of the Mg catalyst was placed in contact with hydrogen gas having a pressure of 390 psia. The sample was initially at 30° C. and was allowed to equilibrate. The temperature was then increased to 50° C. and the sample was allowed to re-equilibrate. Finally, the temperature was increased to 150° C. and allowed to re-equilibrate. The hydrogen absorption was measured repeatedly at each temperature to insure equilibration. The wt. % absorbed hydrogen was found to be ca. 0.19 at 30° C., ca. 0.43 at 50° C., and ca. 0.62 at 150° C. The remarkable result of the experiment is the observation of a non-zero hydrogen absorption at 30° C. and 50° C. Conventional Mg, even in an activated state, shows essentially no hydrogen absorption at 30° C. and 50° C. The instant Mg catalyst, in contrast, shows measurable hydrogen absorption due to enhanced catalytic activity.

Figure 3:
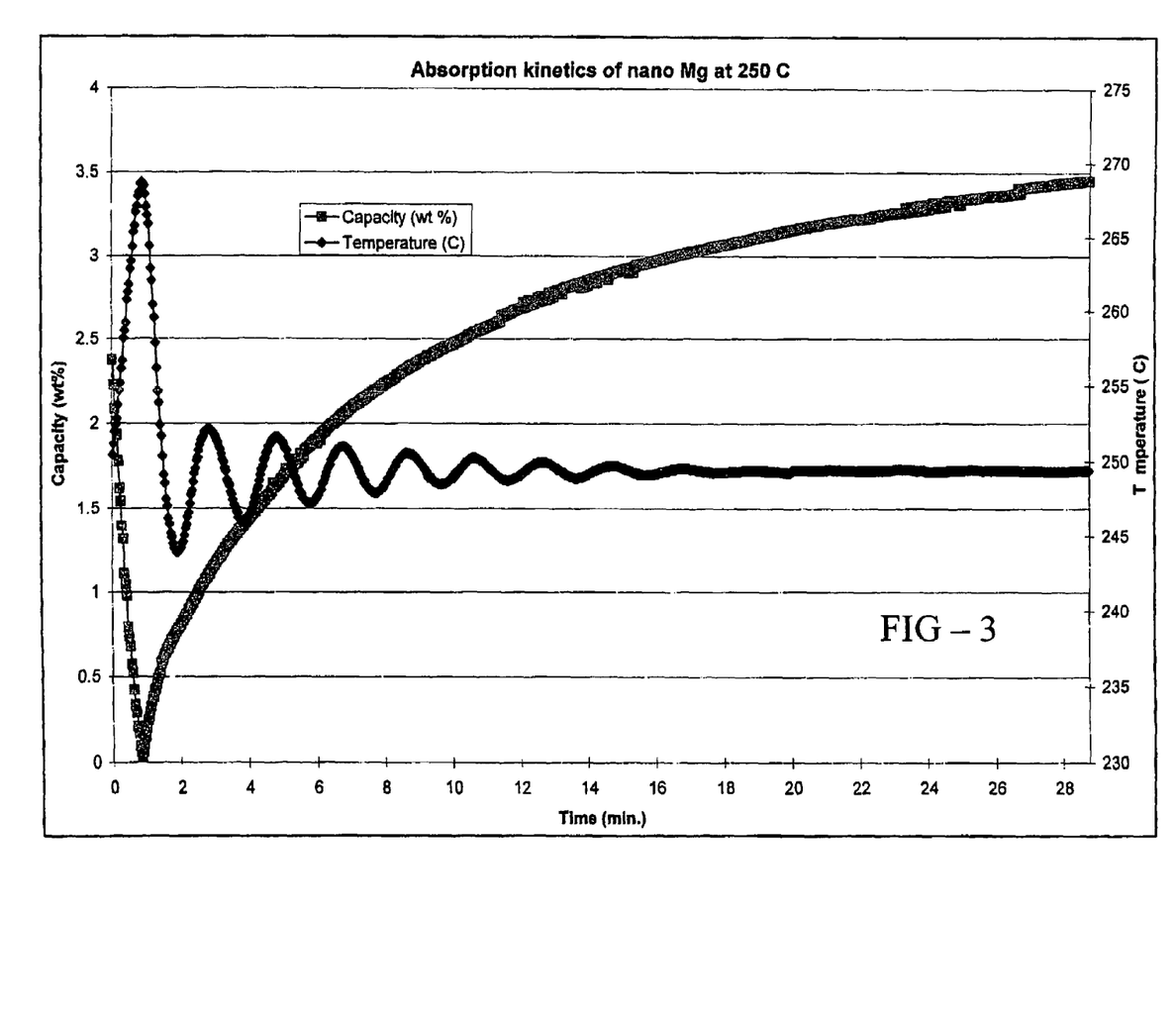
FIG. 3. Hydrogen absorption kinetics of a Mg catalyst according to the instant invention at 250° C.
Figure 4:
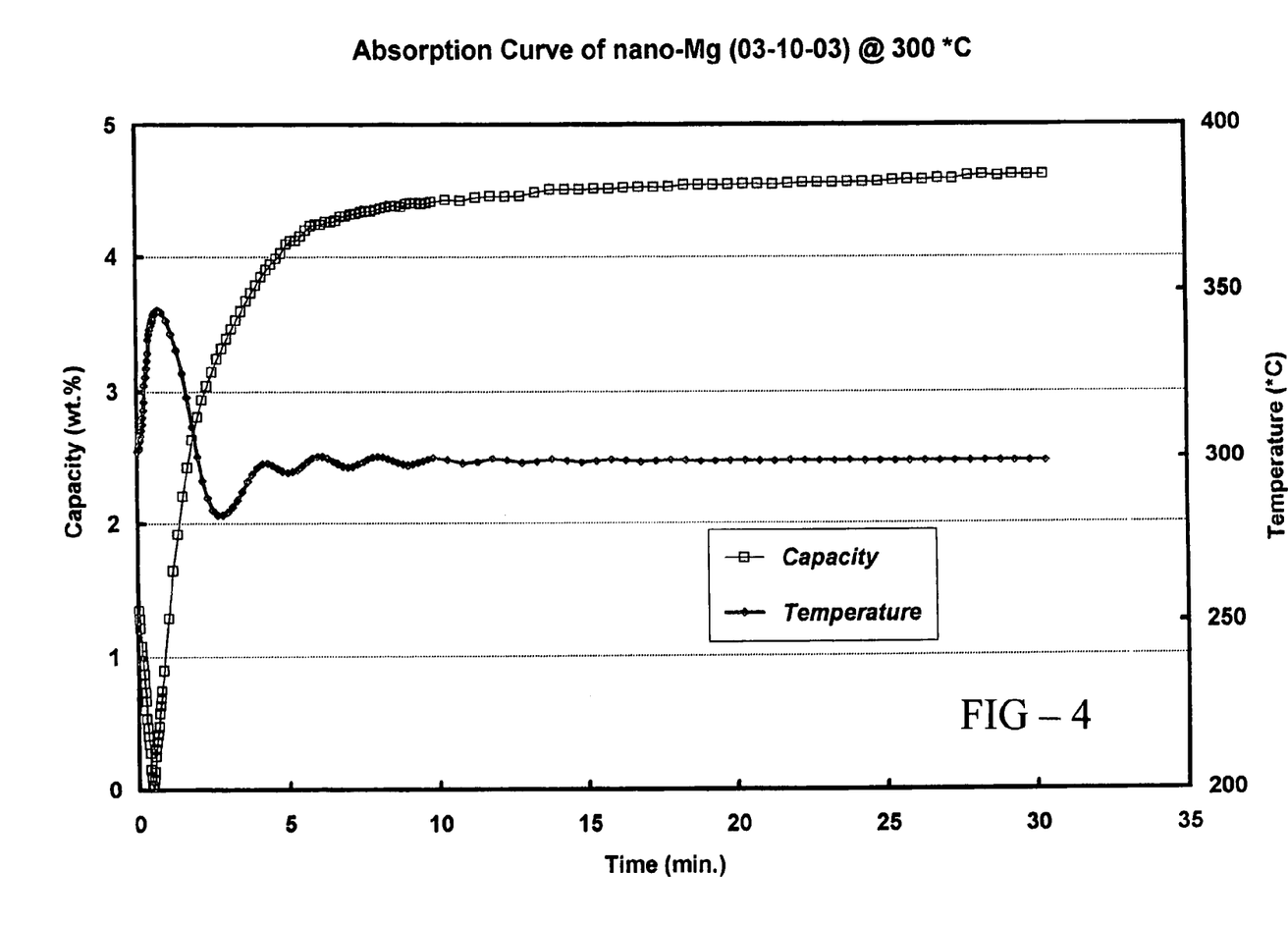
FIG. 4. Hydrogen absorption kinetics of a Mg catalyst according to the instant invention at 300° C.

FIGS. 3 and 4 show the absorption kinetics of the instant Mg catalyst, in unactivated form, at 250° C. and 300° C., respectively. The figures show the hydrogen storage capacity (wt. % of absorbed hydrogen (upper curve at long time)) and the catalyst temperature (lower curve at long time) as a function of time. After a short term drop off upon initial exposure to hydrogen gas, the storage capacity shows a rapid increase at both temperatures before leveling off at or near an equilibrium value. At 300° C., the equilibrium storage capacity is above 4.5%. Most of the equilibrium hydrogen content is stored in the first five minutes of exposure. At 250° C., the equilibrium storage capacity is about 3.5% and is obtained after about 30 min. exposure. The noteworthy feature of both figures is the essentially instantaneous absorption of hydrogen upon exposure to hydrogen gas for a Mg based catalytic hydrogen storage material in an unactivated state. This behavior contrasts with conventional Mg alloys, which only show hydrogen absorption upon activation. The improved hydrogen absorption characteristics of the instant Mg catalyst are a consequence of an increased rate of hydrogen absorption for the instant quantum limit Mg catalyst relative to a conventional macroscopic Mg catalyst. The hydrogen absorption observed for the instant unactivated Mg catalyst is a consequence of the improved catalytic activity resulting from the novel structure, topology, wavefunction characteristics, and electron density distribution associated with the quantum limit.

EXAMPLE 3

In this example, the preparation of a quantum limit V catalyst is described. An organometallic vanadium precursor, V(Cp)(CO)$_4$ (Cp=cyclopentadienyl) is used in the preparation. 4.963 g of the vanadium precursor were placed in decane and refluxed until a black precipitate was formed. The precipitate was analyzed to be V and XRD and SEM analysis showed that the product consisted of aggregations of V having an average size of 40 Å.

EXAMPLE 4

In this example, the sonochemical preparation of a quantum limit Co catalyst is described. An organometallic Co precursor, Co(CO)$_4$(NO), was used as a starting material. The Co precursor was placed in Decalin in a beaker and sonicated as described in EXAMPLE 1 hereinabove. Upon termination of the reaction, black powder product was observed. XRD analysis indicated that the product was highly disordered and amorphous-like.

The disclosure and discussion set forth herein is illustrative and not intended to limit the practice of the instant invention. Numerous equivalents and foreseeable variations thereof are envisioned to be within the scope of the instant invention. It is the following claims, including all equivalents, in combination with the foregoing disclosure, which define the scope of the instant invention.

I claim:

1. A quantum limit catalyst comprising:
catalytic atomic aggregations, said atomic aggregations consisting essentially of an assembly of atoms of one or more metal elements, said atomic aggregations having a size of 100 Å or less, said size placing said atomic aggregations in the quantum limit, said quantum limit atomic aggregations having a non-crystalline structure.

2. The catalyst of claim 1, wherein said one or more metal elements of said atomic aggregations include a transition metal.

3. The catalyst of claim 1, wherein said one or more metal elements of said atomic aggregations include Fe, Mg, V, or Co.

4. The catalyst of claim 1, wherein said size of said atomic aggregations is less than or equal to 40 Å.

5. The catalyst of claim 1, wherein said size of said atomic aggregations is less than or equal to 20 Å.

6. The catalyst of claim 1, wherein said catalyst is a hydrogen storage material.

7. The catalyst of claim 6, wherein said one or more metal elements of said atomic aggregations of said hydrogen storage material include Mg.

8. The catalyst of claim 7, wherein said catalyst absorbs hydrogen in its unactivated state.

9. The catalyst of claim 8, wherein said unactivated hydrogen storage material absorbs at least 4.5 wt. % hydrogen.

10. The catalyst of claim 8, wherein said unactivated hydrogen storage material absorbs at least 3.5 wt. % hydrogen.

11. The catalyst of claim 8, wherein said unactivated hydrogen storage material absorbs hydrogen at a temperature of 30° C. or above.

12. The catalyst of claim 11, wherein said unactivated hydrogen storage material absorbs at least 0.19 weight percent hydrogen.

13. The catalyst of claim 8, wherein said unactivated hydrogen storage material absorbs hydrogen at a temperature of 50° C. or above.

14. The catalyst of claim 13, wherein said unactivated hydrogen storage material absorbs at least 0.43 weight percent hydrogen.

15. The catalyst of claim 1, wherein said catalytic atomic aggregations consist essentially of an assembly of atoms of two or more metal elements.

16. The catalyst of claim 1, wherein said quantum limit atomic aggregations have an amorphous structure.

17. The catalyst of claim 1, wherein said quantum limit atomic aggregations are comprised primarily of surface atoms, said surface atoms being partially unbonded.

18. The catalyst of claim 1, wherein said quantum limit atomic aggregations consist essentially of an assembly of atoms of Mg.

19. The catalyst of claim 1, wherein said quantum limit atomic aggregations consist essentially of an assembly of atoms of V.

20. The catalyst of claim 1, wherein said quantum limit atomic aggregations consist essentially of an assembly of atoms of Co.

21. The catalyst of claim 1, wherein said quantum limit atomic aggregations consist essentially of an assembly of atoms of Fe.

* * * * *